Sept. 15, 1942.　　G. BENZEL, SR., ET AL　　2,296,014
GRAIN TANK
Filed Oct. 6, 1941　　2 Sheets-Sheet 1
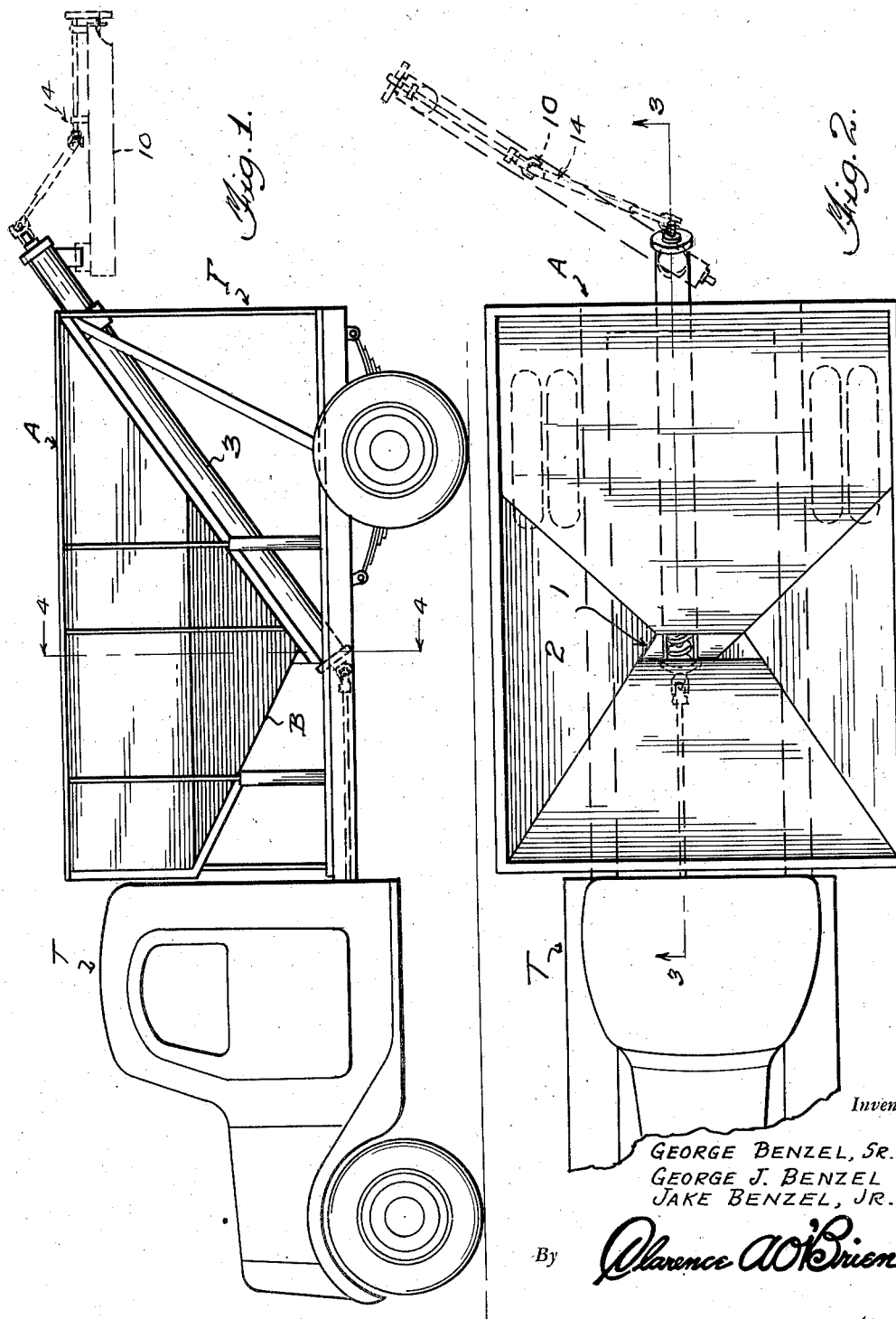
Inventors
GEORGE BENZEL, SR.
GEORGE J. BENZEL
JAKE BENZEL, JR.
By Clarence A. O'Brien
Attorney Sept. 15, 1942.   G. BENZEL, SR., ET AL   2,296,014
GRAIN TANK
Filed Oct. 6, 1941   2 Sheets-Sheet 2
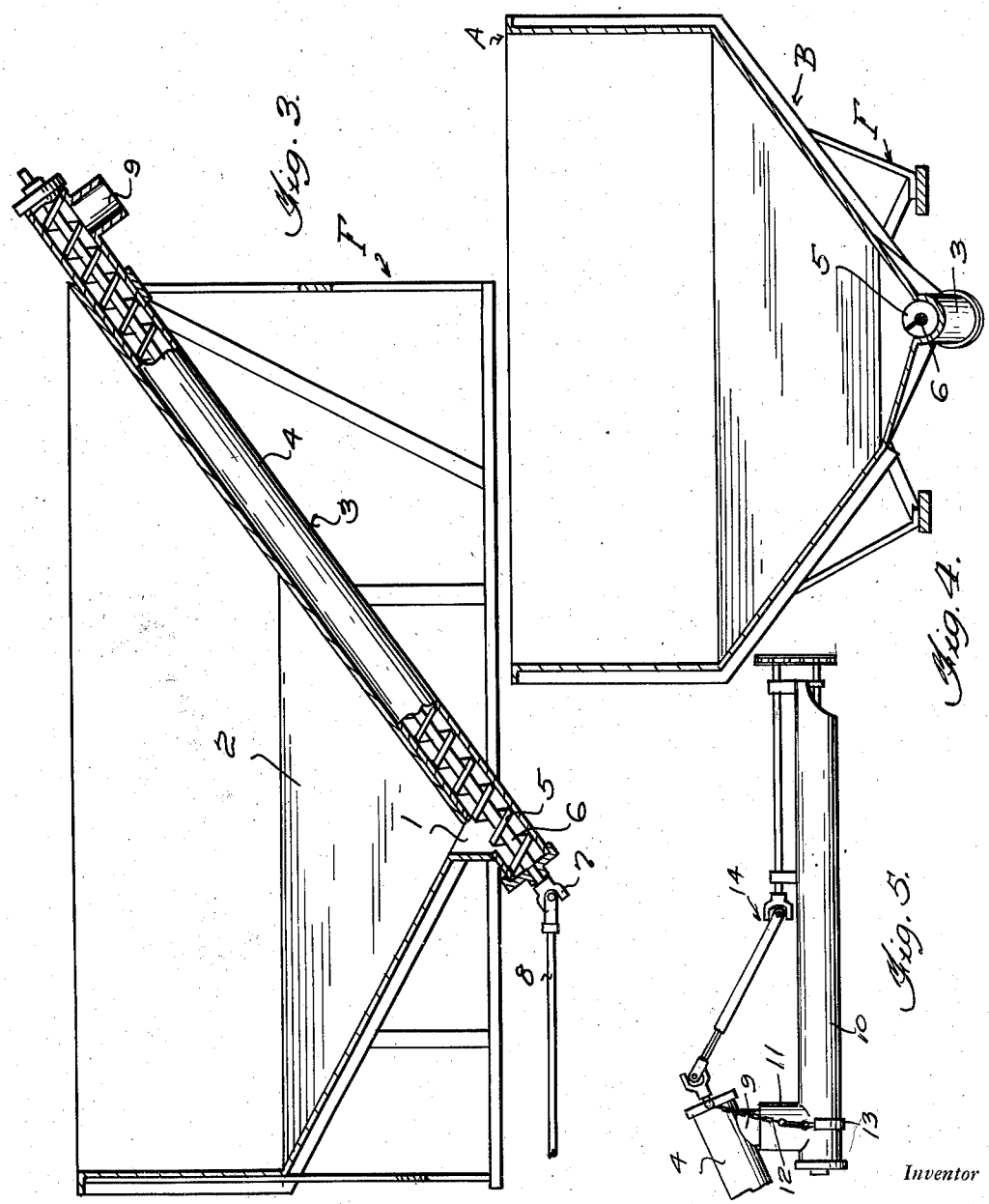
Inventor
GEORGE BENZEL, SR.
GEORGE J. BENZEL
JAKE BENZEL, JR.
By *Clarence A. O'Brien*
Attorney Patented Sept. 15, 1942

2,296,014

UNITED STATES PATENT OFFICE 2,296,014

GRAIN TANK

George Benzel, Sr., George J. Benzel, and Jake Benzel, Jr., Walla Walla, Wash.

Application October 6, 1941, Serial No. 413,898

1 Claim. (Cl. 214—83)

This invention relates to a grain tank mainly designed for use on a truck. The general object of the invention is to make the bottom of the tank slope in four directions to an outlet opening so that the tank is self-cleaning as all grain will flow from the tank under the action of gravity.

Another object of the invention is to provide a conveyor for receiving the grain from the outlet opening of the tank and conveying it to a point where it can be deposited into another container.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is an elevational view of the invention applied to a motor vehicle.

Figure 2 is a top plan view of Figure 1.

Figure 3 is a section on the line 3—3 of Figure 2.

Figure 4 is a section on the line 4—4 of Figure 1.

Figure 5 is a detail view showing how the two conveyors are adjustably connected together.

In these views the letter A indicates the tank which has a substantially conical-shaped bottom part B having the outlet opening 1 therein and this form of bottom provides four sloping walls 2 which slope downwardly and inwardly from the side and end walls of the tank to the opening so that all the grain will be fed by gravity to the opening and the passage of the grain will produce a sucking action which enables the conveyor 3 to carry off all the grain from the tank.

This conveyor includes a tubular casing 4 having an auger-type conveyor means 5 therein, the shaft 6 of which has its ends suitably journaled in the ends of the casing. The opening 1 is formed of a chute-like part which extends from the bottom of the tank into the lower part of the casing 4. The lower end of the shaft 6 is connected by a universal joint 7 with the shaft 8 which is connected with a take-off shaft of the truck T on which the tank rests, as shown in Figures 1 and 2, the tank being supported on the body of the truck by the upright frame F. The conveyor 3 extends along one of the sloping walls of the tank, this wall extends from a point at the top of the tank to the opening 1 and a downwardly extending discharge spout 9 leads from the top of the conveyor 3. An auxiliary conveyor 10 of the same type as that shown at 3 has an upwardly extending spout 11 at its lower end for receiving the spout 9 and the two conveyors are connected together in any suitable manner such as by means of the chain 12 and the strap 13 shown in Figure 5. As shown in dotted lines in Figures 1 and 2 the auxiliary conveyor can be adjusted to different positions relative to the conveyor 3 so as to convey the grain to either side of the truck or to the rear thereof so that the grain can be delivered to any form of receptacle from the tank on the truck.

Also, the auger of the conveyor 10 can be driven from the conveyor 3 in any suitable manner, such as shown at 14, see Figure 5.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In combination with a truck including a body, a tank supported on the body for receiving grain and having an opening in its lower end, portions of the walls of the tank sloping downwardly and inwardly to the opening to make the tank self-cleaning, a conveyor connected to the rear wall of the tank and sloping upwardly and rearwardly and having an opening therein in communication with the opening of the tank, said conveyor including a tubular casing and an auger therein, means for rotating the auger by one of the take-off shafts of the truck, said casing having a discharge downspout adjacent its upper end, a second conveyor movably connected at one end to said downspout to swing around the same and including an auger and means for rotating the auger of the second conveyor from the first auger.

GEORGE BENZEL, SR.
GEORGE J. BENZEL.
JAKE BENZEL, JR.